Figure 1:
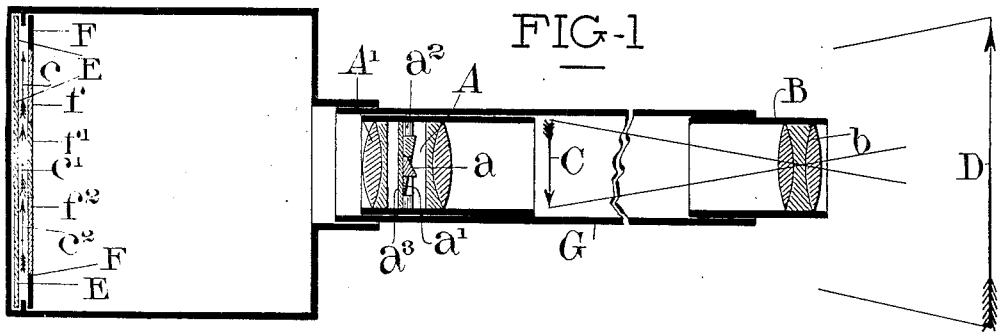

R. BERTHON & M. AUDIBERT.
CAMERA FOR COLOR PHOTOGRAPHY.
APPLICATION FILED OCT. 28, 1911.

1,126,689.

Patented Feb. 2, 1915.

4 SHEETS—SHEET 1.

Witnesses:
Jean Germain
Guillaume Pioche

Inventors
Rodolphe Berthon
Maurice Audibert

R. BERTHON & M. AUDIBERT.
CAMERA FOR COLOR PHOTOGRAPHY.
APPLICATION FILED OCT. 28, 1911.
1,126,689.
Patented Feb. 2, 1915.
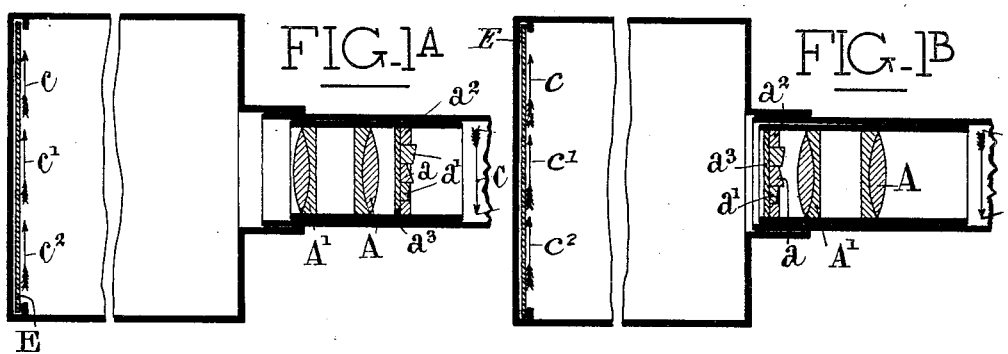
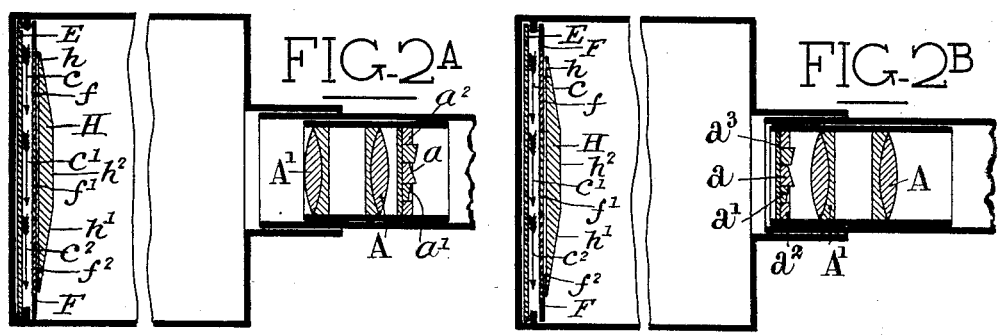
Witnesses:
Inventors:

R. BERTHON & M. AUDIBERT.
CAMERA FOR COLOR PHOTOGRAPHY.
APPLICATION FILED OCT. 28, 1911.
1,126,689.
Patented Feb. 2, 1915.
4 SHEETS—SHEET 3.
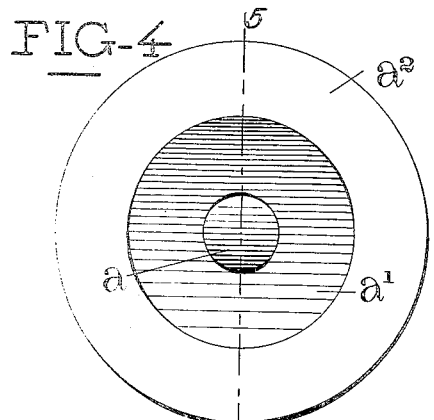
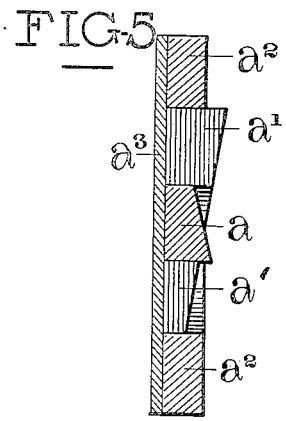
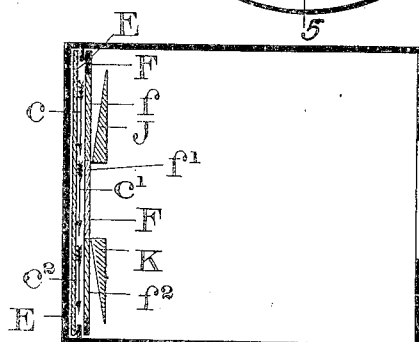
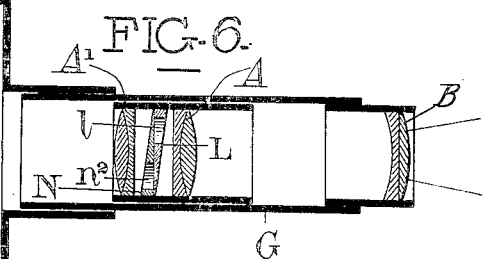
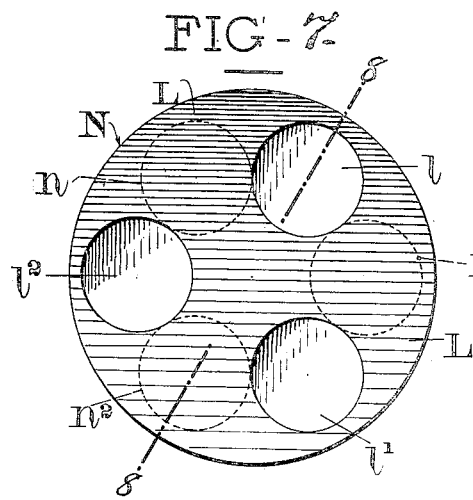
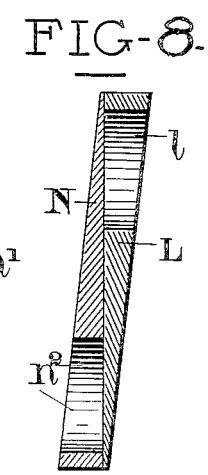
Witnesses:
Jean Germain
Guillaume Pioche
Inventors:
Rodolphe Berthon
Maurice Audibert

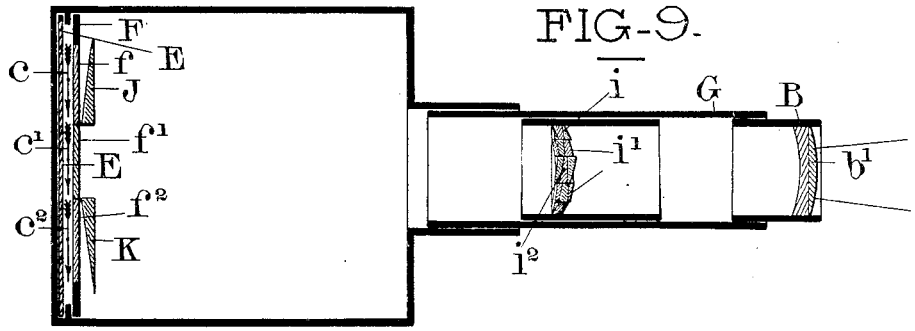
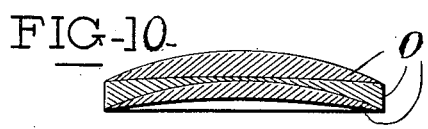
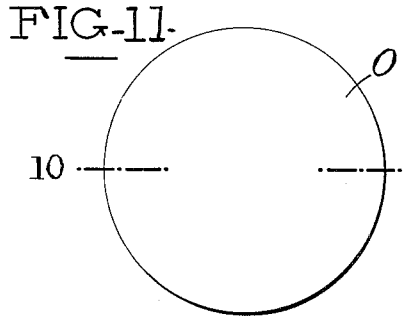
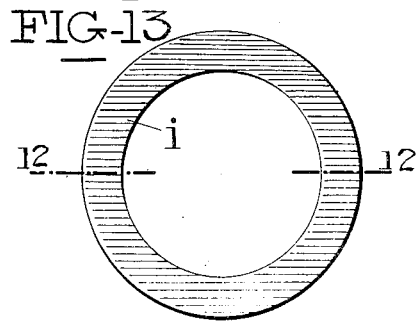
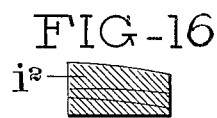
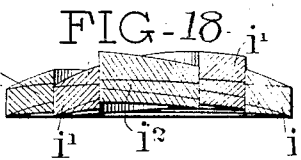
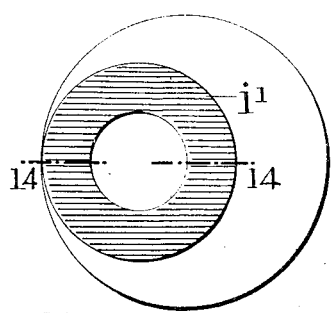
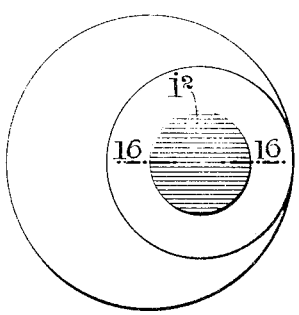
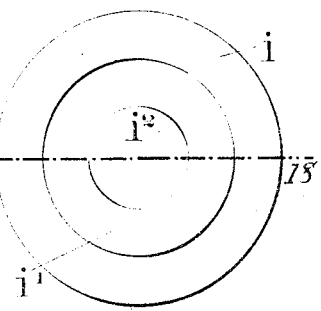

UNITED STATES PATENT OFFICE.

RODOLPHE BERTHON AND MAURICE AUDIBERT, OF VILLEURBANNE, FRANCE; SAID BERTHON ASSIGNOR TO SAID AUDIBERT.

CAMERA FOR COLOR PHOTOGRAPHY.

1,126,689.  Specification of Letters Patent.  Patented Feb. 2, 1915.

Application filed October 28, 1911. Serial No. 657,235.

*To all whom it may concern:*

Be it known that we, RODOLPHE BERTHON and MAURICE AUDIBERT, both citizens of the Republic of France, residing at 7 Avenue Victor Hugo, Villeurbanne, in the Republic of France, have invented certain new and useful Improvements in Cameras for Color Photography, of which the following is a specification.

The present invention has for its object to obtain, upon one and the same surface, monochrome proofs arranged in juxtaposition and printed in the fundamental colors which when projected onto a screen reproduce the object photographed in colors.

With this object the invention consists in photographing instead of the scene itself a real or virtual image in space of this scene, by means of an objective provided with prisms or mirrors which are arranged concentrically or uniformly in accordance with an axis of symmetry. Owing to the possibility of modifying the position of this image in space as desired by displacing the optical element which produces it (an objective of very wide aperture or a well-corrected divergent lens) it is possible, without the necessity for touching the system of prisms or mirrors, to modify as desired the position of the principal objective and consequently to regulate exactly the angular displacement of the three monochromes upon the sensitized film (this displacement is proportionate to that of the objective) while at the same time insuring perfect focusing. The exact superposition of the three monochromes can therefore also always be insured even when the apparatus for taking the pictures is not identical with the projection apparatus. On the other hand, the distance of the image in space from the principal objective being necessarily small and its relative dimensions being as small as desired (proportionately to the focus of the optical element employed) it is always possible to utilize a principal objective of relatively long focus and to give it a considerable aperture, thus reducing to the minimum the angle of deviation of the three monochromes and consequently the aberrations that the employment of prisms of considerable angles or very oblique mirrors always entails. Finally, by imparting to the prisms or mirrors of the principal objective the form of elements concentric with the axis of this objective itself, or by arranging the refringent elements in accordance with an axis of symmetry, any stereoscopic effect between the three monochromes is eliminated. The projection can therefore be effected on any desired scale without any danger of producing color smudges upon objects located in different planes. This advantage is especially important in cinematographic projection where the enlargement is considerable. It should be noted also that the fact of photographing not the object itself but an image of this object in space, of itself contributes to eliminate the stereoscopic effect between the monochromes—the optical element which gives rise to the object photographed in space reducing the relief of the several planes in a large measure. Various methods of carrying the invention into practice are illustrated by way of example in the accompanying drawings.

Figure 2:
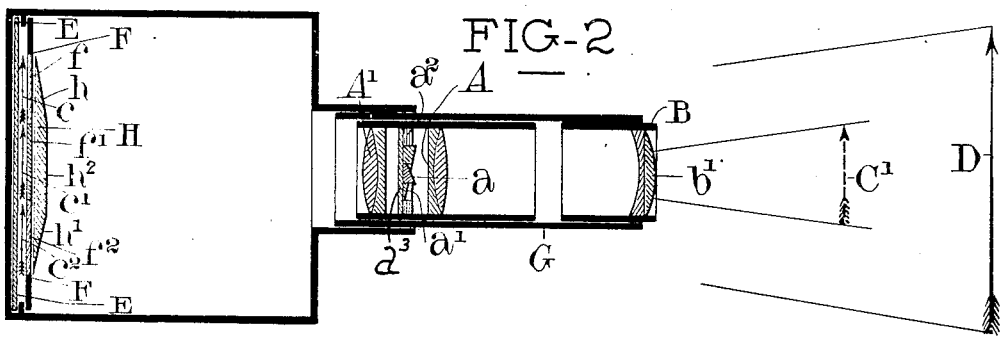
Figure 3:
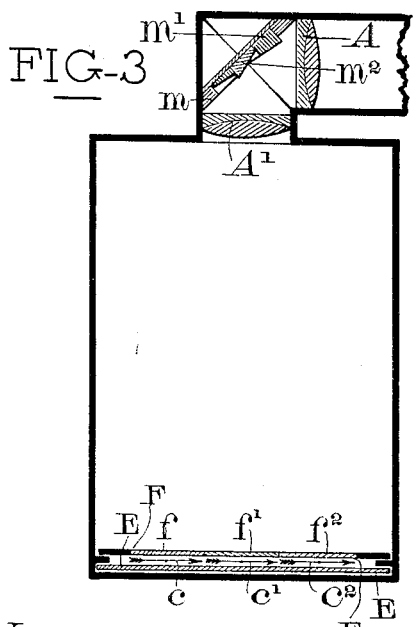

Figures 1, 1$^A$, and 1$^B$ are diagrammatic views of an apparatus for taking views, the front objective of which is constituted by convergent lenses giving a real and inverted image between the said objective and the principal objective, this image being then again taken by this latter and projected upon the sensitized coat in three monochromes by means of a divergent prism apparatus. Figs. 2, 2$^A$, and 2$^B$ are similar views of an apparatus for taking views in which the front objective is constituted by divergent lenses giving, in front of the said objective, a virtual image which is then taken again and divided into three monochromes and projected upon the sensitized coat through a colored screen. Fig. 3 represents a modification in which the real or virtual image obtained by the foregoing means is reflected and divided into three monochromes in juxtaposition by a system of mirrors. Figs. 4 and 5 represent to an enlarged scale, in front elevation and in section on the line 5—5 respectively, the concentric prism arrangement serving for obtaining three monochrome images upon the sensitized coat. Fig. 6 represents a modification in which the concentric prism arrangement is replaced by another in which the refringent elements are arranged in accordance with a center of symmetry. Fig. 7 is a front elevation, to a larger scale, of the prismatic element alone. Fig. 8 is a section on the line 8—8 in Fig. 7. Figs. 9 to 19 represent a means for correcting defects of aberration and astigmatism by means of prisms cut from three ordinary photographic lenses, well-corrected and as thin as possible. Fig. 9 represents the application of this device of lenticular prisms to the view-taking apparatus. Figs. 10 and 11 represent respectively a section on the line 10—10 and in plan a lens serving for obtaining an element of the lenticular prismatic device. Figs. 12 and 13 represent respectively in section on the line 12—12 and in plan, the outer concentric ring of the lenticular prismatic device cut from the said lens. Figs. 14 and 15 represent respectively in section on the line 14—14 and in plan the eccentric median ring of the same lenticular prismatic device. Figs. 16 and 17 represent in section on the line 16—16 and in plan respectively the central core of the same eccentricity as the foregoing of this same lenticular prismatic device. Figs. 18 and 19 represent respectively in section on the line 18—18 and in plan the complete lenticular prismatic device obtained by the combination of the three elements represented in Figs. 10 to 17.

In the embodiment of the invention illustrated on Figs. 1 to $2^b$, A, A' indicate the principal objective provided at its optical center with concentric prisms $a$, $a'$ and $a^2$. The central prism is designated $a$; $a'$ is an annular prism the inclination of which is exactly inverse to that of the central prism $a$, while $a^2$ is a glass ring having parallel faces permitting of the normal operation with deviation of the peripheral zone of the objective. These elements as a whole are stuck to a glass $a^3$ having parallel faces.

In the embodiment of the invention shown in Fig. 1 the prisms are arranged at the center of the objective A, A' and are sufficiently close for the three zones of rays to be comprised in the pencil coming from each point of the image photographed and traversing the objective.

In front of the objective is another objective B having, in this case, convergent lenses $b$. This objective is intended to give a real image of the object D in space at C. There should be a sufficient aperture for the image C viewed from the objective A to be entirely comprised in the luminous zone proceeding from the objective A to the objective B as base. Strictly speaking the objective B could be dispensed with but the result obtained would not be so good as when such an objective is employed.

E designates the sensitized coating upon which the three juxtaposed images $c$, $c'$, $c^2$ are formed. This sensitized coating may be on a plate, cut film or cinematographic film displaced by any convenient known means. In front of this sensitized coating a three-color screen F of the fundamental colors is arranged, the red portion being designated by $f$, the green portion by $f'$ and the blue portion by $f^2$. This three-color screen could be dispensed with if the prisms $a$, $a'$ and $a^2$ were colored with the same colors as the screen.

The adjustment of the position of the objectives A A' and B relatively to the sensitized plate on the one hand and to the object on the other hand, is obtained by means of a known system of screws and racks which is not illustrated in the drawings.

The objective A A' is carried by a single tube G capable of rotating through a certain angle around its axis with the object of permitting of directing the prisms relatively to the images without having to touch the prisms themselves. The relative displacement of the images and the direction of the prisms are therefore regulated without touching the latter, the relative arrangement of which is established once for all with perfect precision.

If desired the prisms $a$, $a'$, $a^2$ may be arranged in front of the objectives A A' as illustrated in Fig. $1^a$. The prisms $a$, $a'$, $a^2$ may also be arranged behind the objective A A' as illustrated in Fig. $1^b$. In the modifications shown in Figs. $1^a$ and $1^b$ the prisms $a$, $a'$, $a^2$ should be arranged sufficiently close to the objective A A' for the three zones of rays to be comprised in the pencil coming from each point of the image photographed and traversing the objective. In these figures the screen F and the front objective B have been omitted, the lens tube being consequently shown broken.

Another modification is illustrated in Fig. 2 where the front objective B is provided with divergent lenses $b'$. In this case the objective B is intended to give a virtual image of the object D in space at C'. The objective A A' and the prisms $a'$, $a^2$, $a^3$ are similar to those employed in Fig. 1. The coating E and the screen F are also similar to those employed in Fig. 1.

In front of the sensitized coating and almost in contact therewith there may be arranged prisms H with inclinations $h$, $h'$ inverse to those which have given rise to the corresponding images. A simple glass $h^2$ with parallel faces and of such thickness that the reflected image presents the maximum of sharpness is placed opposite the image produced without deflection. The prism and the glass can be cut in a single block as is the case in the example illustrated in the drawing.

Figs. $2^a$ and $2^b$ show modifications of the device illustrated in Fig. 2. In Fig. $2^a$ the prisms $a$, $a'$, $a^2$ are arranged in front of the objective A A' while in Fig. $2^b$ they are arranged behind the objective A A'. In Figs. $2^a$ and $2^b$ the prisms should be arranged sufficiently close to the objective A A' for the three zones of rays to be comprised in the pencil coming from each point of the image photographed and transversing the objective. For the sake of clearness the objective B has been omitted from these figures.

A further modification is shown in Fig. 3 the prisms being replaced by inclined mirrors $m$, $m'$ $m^2$, the mirror $m$ being inclined at 45° to the axis of the apparatus, $m'$ rather more, and $m^2$ rather less. The sensitized coat E would then be parallel with the axis of the front objective.

The concentric prism arrangement is clearly illustrated in Figs. 4 and 5.

For projection the arrangement of prisms represented in Figs. 1 to $2^b$, 4 and 5 may be employed.

The concentric prism arrangement which has just been described corresponds to a center of a single pupil, but any arrangement of prisms the refringent elements of which are arranged in accordance with a center of symmetry would lead to the same result.

Figs. 6 to 8 represent a device of this kind which is constituted by two prisms L and N of the same angle stuck one to the other in such a manner as to compensate each other exactly, the prisms being arranged in the objective itself. The prism L is provided with apertures $l$, $l'$, $l^2$, and the prism N with apertures $n$, $n'$, $n^2$. The apertures in the prism L do not register with the apertures in the prism N. In the points at which the two prisms are superposed the rays pass through directly; at the points opposite the apertures in one of the prisms, on the other hand the other prism deviates the rays which strike it. In order to obtain the desired result it is therefore sufficient that the apertures formed in the prisms L and N should have a common center of symmetry which is the case when these apertures present the same form, the same dimensions and occupy the apexes of a regular polygon. Such prisms should be achromatized and the defects of aberration of prisms with entirely plane surfaces should be corrected. This correction may be obtained by applying almost in contact with the photographic plate or film, prisms, J and K which present slight curvature and of the same angle as the prisms L and N but inversely directed. These prisms might be replaced by reflecting surfaces with single center of symmetry serving the same purpose as the mirrors in Fig. 3.

The foregoing description sets forth the essential principle of the invention and the means for carrying it into practice. The employment of prisms with absolutely plane faces however presents the inconvenience of producing defects of optical aberration which is remedied by giving them a slight curvature. A very simple method of obtaining such prisms consists in cutting them from three ordinary photographic lenses, well-corrected and as thin as possible, as shown in Figs. 9 to 19. The following is the method adopted with this object. Taking three lenses 0 similar to that represented in Figs. 10 and 11 in the accompanying drawing, from the first there is cut a ring $i'$ eccentric to the axis of the lens (Figs. 14 and 15) from the third a core $i^2$ (Figs. 16 and 17) also eccentric to the axis of the lens, but of such size as to fit into the ring $i'$; and from the second, a ring $i$ is cut concentric with the axis of the lens and into which the ring $i'$ is adapted to fit. These several elements are then assembled in the manner represented in Figs. 18 and 19.

If the lenses employed are convergent, they furnish a system of prisms which are utilizable alone, as is the case in Fig. 9, which shows the prisms $i$, $i'$, $i^2$, cut and assembled as above described, used in combination with an apparatus similar in construction to that shown in Fig. 6.

What we claim and desire to secure by Letters Patent of the United States is:—

1. A photographic apparatus for obtaining monochrome juxtaposed proofs comprising in combination an objective for projecting an image, and a device comprising concentric prisms for changing the direction of the rays and projecting the image onto a sensitized surface.

2. A photographic apparatus for obtaining monochrome juxtaposed proofs comprising in combination a front objective, a second objective and a system of prisms formed of juxtaposed elements for changing the direction of the rays and projecting an image of the object onto a sensitized coating.

3. A photographic apparatus for obtaining monochrome juxtaposed proofs comprising the combination with a front objective system of lenses for obtaining a virtual image of the object photographed, of another objective a system of lenses and concentric prisms formed of astigmatic prismatic curved elements cut from photographic lenses for the purpose of taking up the said image and breaking it into monochromes projected through a three color screen onto a sensitized surface.

In testimony whereof we affix our signatures in presence of two witnesses.

RODOLPHE BERTHON.
MAURICE AUDIBERT.

Witnesses:
JEAN GERMAIN,
GUILLAUME PIOCHE.